(12) United States Patent
Beeler et al.

(10) Patent No.: US 8,914,536 B2
(45) Date of Patent: Dec. 16, 2014

(54) METHOD AND SYSTEM FOR PERFORMING MULTI-LAYER, MULTI-DIMENSIONAL LINK BUDGET ANALYSIS (LBA) USING REAL-TIME NETWORK, WEATHER, SATELLITE EPHEMERAS AND IONOSPHERIC INFORMATION

(75) Inventors: Michael Beeler, Jefferson, MD (US); John Baddick, Gettysburg, PA (US); Wallace Davis, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 174 days.

(21) Appl. No.: 13/437,767

(22) Filed: Apr. 2, 2012

(65) Prior Publication Data

US 2012/0188880 A1  Jul. 26, 2012

Related U.S. Application Data

(63) Continuation-in-part of application No. 13/436,302, filed on Mar. 30, 2012.

(60) Provisional application No. 61/596,124, filed on Feb. 7, 2012, provisional application No. 61/592,948, filed on Jan. 31, 2012.

(51) Int. Cl.
G06F 15/16 (2006.01)
H04L 12/24 (2006.01)
H04B 7/185 (2006.01)
H04W 24/08 (2009.01)

(52) U.S. Cl.
CPC .......... H04L 41/145 (2013.01); H04B 7/18513 (2013.01); H04W 24/08 (2013.01)
USPC ....................................................... 709/231

(58) Field of Classification Search
USPC .................................. 709/213, 231; 455/13.1
See application file for complete search history.

(56) References Cited

U.S. PATENT DOCUMENTS

| | | | |
|---|---|---|---|
| 6,058,260 A * | 5/2000 | Brockel et al. ..................... 703/4 |
| 6,148,179 A * | 11/2000 | Wright et al. ................. 455/66.1 |
| 6,160,998 A * | 12/2000 | Wright et al. ................. 455/66.1 |
| 6,163,681 A * | 12/2000 | Wright et al. ................. 455/66.1 |
| 6,167,238 A * | 12/2000 | Wright .......................... 455/66.1 |
| 6,167,239 A * | 12/2000 | Wright et al. ................. 455/66.1 |
| 6,173,159 B1 * | 1/2001 | Wright et al. ................. 455/66.1 |
| 6,353,734 B1 * | 3/2002 | Wright et al. ................... 455/98 |
| 6,771,966 B1 * | 8/2004 | Chow ............................ 455/446 |

(Continued)

FOREIGN PATENT DOCUMENTS

| | | |
|---|---|---|
| CN | 102136946 A | 7/2011 |
| JP | 2001313598 A | 11/2001 |
| KR | 100685740 B1 | 2/2007 |

*Primary Examiner* — Kevin Bates
*Assistant Examiner* — Clarence D McCray
(74) *Attorney, Agent, or Firm* — Booth Udall Fuller, PLC

(57) ABSTRACT

Methods of dynamically modeling performance of a communications network that may include modeling a communications network using a processor by performing a link budget analysis (LBA) for a configuration of the communications network, receiving a plurality of layers of real-time information about the communications network, iteratively performing additional LBAs using one or more of the layers of real-time information from among the plurality of layers of real-time information, multi-dimensionally co-modeling a matrix comprising results of the iteratively performed additional LBAs, and determining one or more final communications network configuration parameters based on the multi-dimensionally co-modeled matrix.

36 Claims, 14 Drawing Sheets

(56) References Cited

U.S. PATENT DOCUMENTS

| | | | |
|---|---|---|---|
| 7,047,029 B1* | 5/2006 | Godwin et al. | 455/505 |
| RE40,479 E * | 9/2008 | Wright et al. | 455/98 |
| 7,460,830 B2* | 12/2008 | Moore, III | 455/13.2 |
| 7,990,874 B2* | 8/2011 | del Rio Herrero et al. | 370/236 |
| 7,991,353 B2* | 8/2011 | Moore, III | 455/13.2 |
| 8,385,817 B2* | 2/2013 | Dankberg et al. | 455/10 |
| 8,718,673 B2* | 5/2014 | Harper | 455/456.1 |
| 8,849,193 B2* | 9/2014 | Dale | 455/13.4 |
| 2002/0168974 A1* | 11/2002 | Rosen et al. | 455/429 |
| 2003/0087641 A1* | 5/2003 | Gustafsson | 455/446 |
| 2005/0143005 A1* | 6/2005 | Moore, III | 455/13.1 |
| 2007/0242955 A1* | 10/2007 | Kavehrad | 398/130 |
| 2009/0053995 A1* | 2/2009 | Moore, III | 455/13.1 |
| 2009/0319236 A1* | 12/2009 | Blaunshtein et al. | 703/1 |
| 2010/0054131 A1* | 3/2010 | del Rio Herrero et al. | 370/236 |
| 2010/0305885 A1* | 12/2010 | Ganapathy et al. | 702/55 |
| 2011/0287779 A1* | 11/2011 | Harper | 455/456.1 |
| 2012/0178363 A1* | 7/2012 | Moore, III | 455/13.2 |
| 2012/0188880 A1* | 7/2012 | Beeler et al. | 370/246 |
| 2012/0191824 A1* | 7/2012 | Davis et al. | 709/220 |
| 2014/0148202 A1* | 5/2014 | Harper | 455/456.6 |
| 2014/0169303 A1* | 6/2014 | Jami et al. | 370/329 |

* cited by examiner

| CALCULATIONS AT SATURATION | VALUE | | | UNITS |
|---|---|---|---|---|
| Gain 1m^2 | 44.53 | | | dB/m2 |
| Uplink C/No | 108.07 | | | dB.Hz |
| Downlink C/No | 112.97 | | | dB.Hz |
| Total C/No | 106.85 | | | dB.Hz |
| Uplink EIRP for saturation | 73.08 | | | dBW |
| Effective SFD | -90 | | | dBW/m2 |

FIG. 6A

| GENERAL CALCULATIONS | UP | DOWN | | UNITS |
|---|---|---|---|---|
| Elevation | 34 | 34 | | degrees |
| True azimuth | 237.17 | 237.17 | | degrees |
| Compass bearing | 232.99 | 232.99 | | degrees |
| Path distance to satellite | 38263.88 | 38263.88 | | km |
| Propagation time delay | 0.127634 | 0.127634 | | seconds |
| Antenna efficiency | 0.12 | 31.34 | | % |
| Antenna gain | 26 | 56 | | dBi |
| Availability (average year) | 99.95 | 99.95 | | % |
| Link downtime (average year) | 4.383 | 4.383 | | hours |
| Availability (worst month) | 99.79 | 99.79 | | % |
| Link downtime (worst month) | 1.537 | 1.537 | | hours |

FIG. 6B

| UPLINK CALCULATION | CLEAR | RAIN UP | RAIN DOWN | UNITS |
|---|---|---|---|---|
| Uplink transmit EIRP | 43.94 | 43.94 | 43.94 | dBW |
| Transponder input back-off (total) | 6.5 | 6.5 | 6.5 | dB |
| Input back-off per carrier | 13.9 | 16.98 | 13.9 | dB |
| Antenna mispoint | 0.3 | 0.3 | 0.3 | dB |
| Free space loss | 207.18 | 207.18 | 207.18 | dB |
| Atmospheric absorption | 0.14 | 0.22 | 0.14 | dB |
| Tropospheric scintillation fading | 0 | 0.47 | 0 | dB |
| Cloud attenuation | 0 | 0.12 | 0 | dB |
| Rain attenuation | 0 | 2.85 | 0 | dB |
| Total attenuation (gas-rain-cloud-scintillation) | 0.14 | 3.22 | 0.14 | dB |
| Other path losses | 0 | 0 | 0 | dB |
| Uplink power control | 0 | 0 | 0 | dB |
| Uncompensated fade | 0 | 3.08 | 0 | dB |
| C/No (thermal) | 78.92 | 75.84 | 78.92 | dB.Hz |
| C/N (thermal) | 9.05 | 5.97 | 9.05 | dB |
| C/ACI | 25.03 | 21.95 | 25.03 | dB |
| C/ASI | 6.53 | 3.45 | 6.53 | dB |
| C/XPI | 25.03 | 21.92 | 25.03 | dB |
| C/IM | 30.03 | 30.03 | 30.03 | dB |
| C/(N+I) [ ≈ Es/(No+Io) ] | 4.51 | 1.44 | 4.51 | dB |
| Eb/(No+Io) | 3.24 | 0.16 | 3.24 | dB |

FIG. 6C

| DOWNLINK CALCULATION | CLEAR | RAIN UP | RAIN DOWN | UNITS |
|---|---|---|---|---|
| Satellite EIRP total | 56 | 56 | 56 | dBW |
| Transponder output back-off (total) | 4.1 | 4.1 | 4.1 | dB |
| Output back-off per carrier | 11.5 | 14.58 | 11.5 | dB |
| Satellite EIRP per carrier | 44.5 | 41.42 | 44.5 | dBW |
| Antenna mispoint | 0.3 | 0.3 | 0.3 | dB |
| Free space loss | 205.65 | 205.65 | 205.65 | dB |
| Atmospheric absorption | 0.11 | 0.11 | 0.16 | dB |
| Tropospheric scintillation fading | 0 | 0 | 0.3 | dB |
| Cloud attenuation | 0 | 0 | 0.08 | dB |
| Rain attenuation | 0 | 0 | 1.89 | dB |
| Total attenuation (gas-rain-cloud-scintillation) | 0.11 | 0.11 | 2.15 | dB |
| Other path losses | 0 | 0 | 0 | dB |
| Noise increase due to precipitation | 0 | 0 | 2.25 | dB |
| Downlink degradation (DND) | 0 | 0 | 4.3 | dB |
| Total system noise | 134.01 | 134.01 | 225.12 | K |
| Figure of merit (G/T) | 34.43 | 34.43 | 32.18 | dB/K |
| C/No (thermal) | 101.47 | 98.39 | 97.17 | dB.Hz |
| C/N (thermal) | 31.6 | 28.52 | 27.3 | dB |
| C/ACI | 25.03 | 21.95 | 25.03 | dB |
| C/ASI | 30.03 | 26.95 | 30.03 | dB |
| C/XPI | 25.03 | 21.95 | 23 | dB |
| C/IM | 25 | 25 | 25 | dB |
| C/(N+i) [ = Es/(No+io) ] | 19.53 | 17.13 | 18.49 | dB |
| Eb/(No+io) | 18.26 | 15.86 | 17.22 | dB |

FIG. 6D

| TOTALS PER CARRIER (End-to-End) | CLEAR | RAIN UP | RAIN DOWN | Units |
|---|---|---|---|---|
| C/No (thermal) | 78.9 | 75.82 | 78.86 | dB.Hz |
| C/N (thermal) | 9.03 | 5.95 | 8.99 | dB |
| C/ACI | 22.02 | 18.94 | 22.02 | dB |
| C/ASI | 6.51 | 3.43 | 6.51 | dB |
| C/XPI | 22.02 | 18.92 | 20.89 | dB |
| C/IM | 23.81 | 23.81 | 23.81 | dB |
| C/I (total) | 6.2 | 3.15 | 6.16 | dB |
| C/(No+Io) | 74.24 | 71.19 | 74.21 | dB.Hz |
| C/(N+I) [ = Es/(No+Io) ] | 4.37 | 1.32 | 4.34 | dB |
| Eb/(No+Io) | 3.1 | 0.05 | 3.07 | dB |
| Implementation loss | 0 | 0 | 0 | dB |
| System margin | 0 | 0 | 0 | dB |
| Net Es/(No+Io) | 4.37 | 1.32 | 4.34 | dB |
| Required Es/(No+Io) | 1.32 | 1.32 | 1.32 | dB |
| Excess margin | 3.05 | 0 | 3.02 | dB |

FIG. 6E

| EIRP DENSITY CALCULATIONS | CLEAR | RAIN UP | RAIN DOWN | Units |
|---|---|---|---|---|
| Flange transmit (up) | -51.93 | -51.93 | -51.93 | dBW/Hz |
| Satellite (down) | -25.37 | -28.45 | -25.37 | dBW/Hz |
| Flange receive (down) | -175.13 | -178.21 | -179.43 | dBW/Hz |

FIG. 6F

| EARTH STATION POWER REQUIREMENTS | VALUE | UNITS |
|---|---|---|
| EIRP per carrier | 43.94 | dBW |
| Antenna gain | 26 | dBi |
| Antenna feed flange power per carrier | 17.94 | dBW |
| Uplink power control | 0 | dB |
| HPA output back off | 0 | dB |
| Waveguide loss | 3 | dB |
| Number of HPA carriers | 1 | |
| Total HPA power required | 20.9389 | dBW |
| Required HPA power | 124.1342 | W |

FIG. 6G

| SPACE SEGMENT UTILIZATION | VALUE | UNITS |
|---|---|---|
| Overall availability | 99.9 | % |
| Information rate | 13 | Mbps |
| Information rate (inc overhead) | 13 | Mbps |
| Transmit rate | 19.403 | Mbps |
| Symbol rate | 9.7015 | Mbaud |
| Noise Bandwidth | 69.87 | dB.Hz |
| Occupied bandwidth | 13.097 | MHz |
| Minimum allocated bandwidth required | 13.097 | MHz |
| Allocated transponder bandwidth | 13.097 | MHz |
| Link efficiency | 0.993 | bps/Hz |
| Percentage transponder bandwidth used | 18.19 | % |
| Used transponder power | 44.5 | dBW |
| Percentage transponder power used | 18.18 | % |
| Max carriers / transponder | 5.5 | |
| Limited by: | Bandwidth | |
| Power equivalent bandwidth usage | 13.0909 | MHz |

FIG. 6H

| MODCOD | MODULATION INDEX | FEC RATE | Spectral Efficiency | Eb/No dB | Es/No dB |
|---|---|---|---|---|---|
| 0 | 1 (BPSK) | 0.488 | 0.4876 | 2.400 | -0.716 |
| 1 | 2 (QPSK) | 0.533 | 1.0669 | 2.200 | 2.478 |
| 2 | 2 (QPSK) | 0.631 | 1.2620 | 2.800 | 3.811 |
| 3 | 2 (QPSK) | 0.706 | 1.4111 | 3.300 | 4.798 |
| 4 | 2 (QPSK) | 0.803 | 1.6061 | 3.800 | 5.857 |
| 5 | 3 (8-QAM) | 0.642 | 1.9273 | 4.600 | 7.447 |
| 6 | 3 (8-QAM) | 0.711 | 2.1338 | 5.200 | 8.490 |
| 7 | 3 (8-QAM) | 0.780 | 2.3403 | 5.600 | 9.292 |
| 8 | 4 (16-QAM) | 0.731 | 2.9254 | 6.300 | 10.954 |
| 9 | 4 (16-QAM) | 0.780 | 3.1205 | 7.000 | 11.942 |
| 10 | 4 (16-QAM) | 0.829 | 3.3155 | 7.500 | 12.706 |
| 11 | 4 (16-QAM) | 0.853 | 3.4130 | 8.000 | 13.330 |

FIG. 7

| MODCOD | MODULATION INDEX & FEC | FEC RATE | Spectral Efficiency | Es/No (dB) |
|---|---|---|---|---|
| 0 | QPSK 1/4 | 0.250 | 0.490243 | -2.35 |
| 1 | QPSK 1/3 | 0.333 | 0.656448 | -1.24 |
| 2 | QPSK 2/5 | 0.400 | 0.789412 | -0.30 |
| 3 | QPSK 1/2 | 0.500 | 0.988858 | 1.00 |
| 4 | QPSK 3/5 | 0.600 | 1.188304 | 2.23 |
| 5 | QPSK 2/3 | 0.667 | 1.322253 | 3.10 |
| 6 | QPSK 3/4 | 0.750 | 1.487473 | 4.03 |
| 7 | QPSK 4/5 | 0.800 | 1.587196 | 4.68 |
| 8 | QPSK 5/6 | 0.833 | 1.654663 | 5.18 |
| 9 | QPSK 8/9 | 0.889 | 1.766451 | 6.20 |
| 10 | QPSK 9/10 | 0.900 | 1.788612 | 6.42 |
| 11 | 8PSK 3/4 | 0.750 | 1.779991 | 5.50 |
| 12 | 8PSK 2/3 | 0.667 | 1.980636 | 6.62 |
| 13 | 8PSK 3/4 | 0.750 | 2.228124 | 7.91 |
| 14 | 8PSK 5/6 | 0.833 | 2.478562 | 9.35 |
| 15 | 8PSK 8/9 | 0.889 | 2.646012 | 10.69 |
| 16 | 8PSK 9/10 | 0.900 | 2.679207 | 10.98 |
| 17 | 16APSK 2/3 | 0.667 | 2.637201 | 8.97 |
| 18 | 16APSK 3/4 | 0.750 | 2.966728 | 10.21 |
| 19 | 16APSK 4/5 | 0.800 | 3.165623 | 11.03 |
| 20 | 16APSK 5/6 | 0.833 | 3.300184 | 11.61 |
| 21 | 16APSK 8/9 | 0.889 | 3.523143 | 12.89 |
| 22 | 16APSK 9/10 | 0.900 | 3.567342 | 13.13 |
| 23 | 32APSK 3/4 | 0.750 | 3.703295 | 12.73 |
| 24 | 32APSK 4/5 | 0.800 | 3.951571 | 13.64 |
| 25 | 32APSK 5/6 | 0.833 | 4.119540 | 14.28 |
| 26 | 32APSK 8/9 | 0.889 | 4.397854 | 15.69 |
| 27 | 32APSK 9/10 | 0.900 | 4.453027 | 16.05 |

FIG. 8

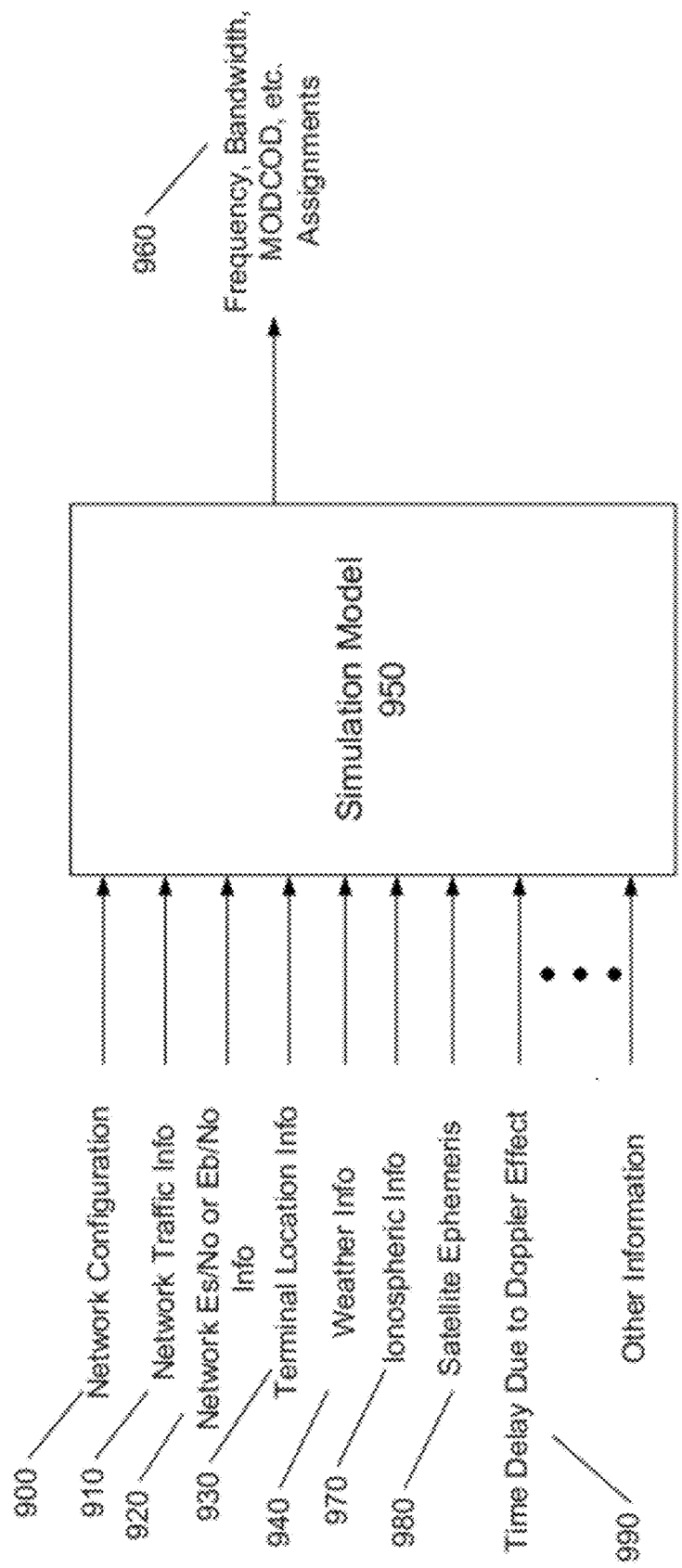

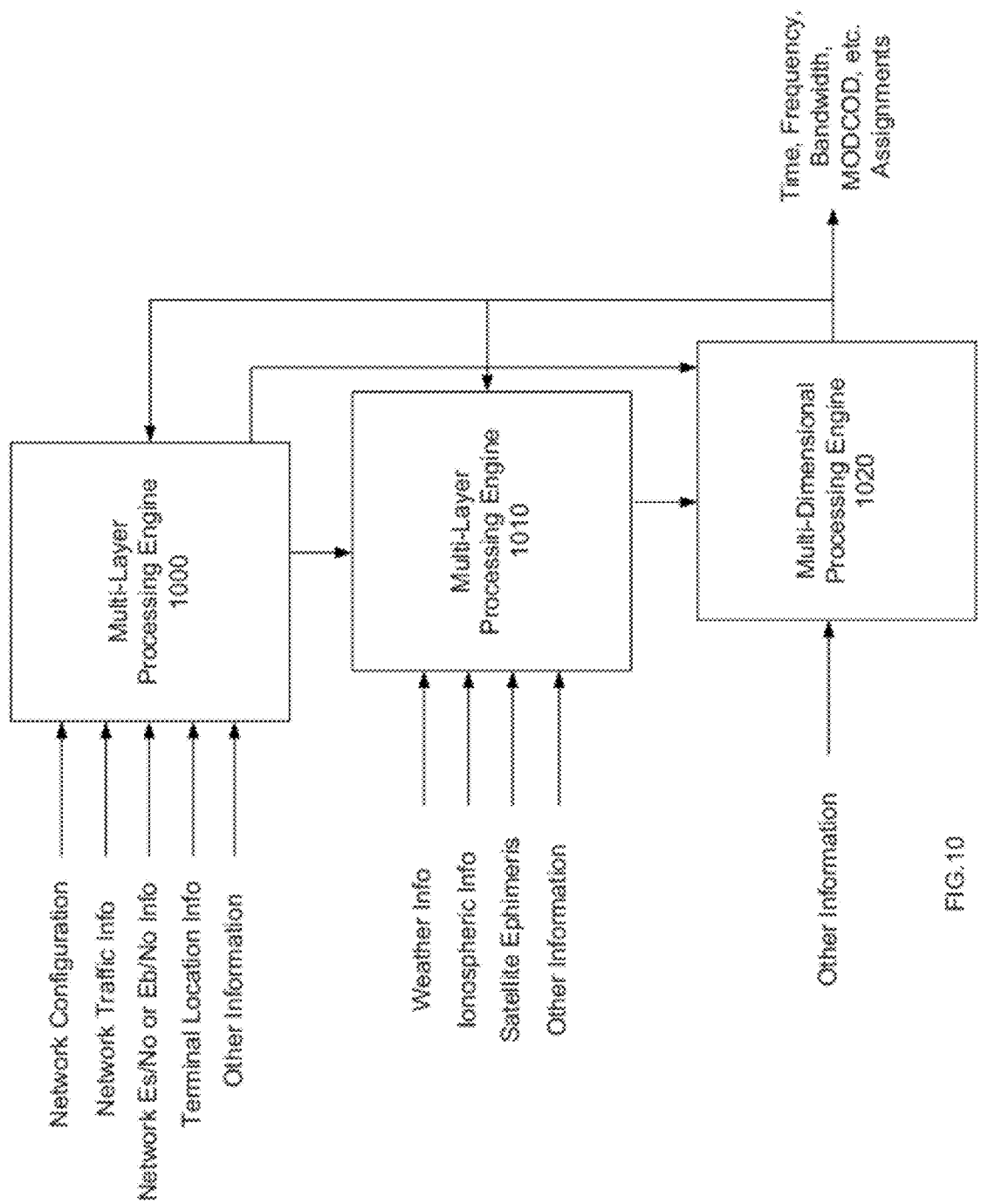

_US 8,914,536 B2_

METHOD AND SYSTEM FOR PERFORMING MULTI-LAYER, MULTI-DIMENSIONAL LINK BUDGET ANALYSIS (LBA) USING REAL-TIME NETWORK, WEATHER, SATELLITE EPHEMERAS AND IONOSPHERIC INFORMATION

CROSS REFERENCE TO RELATED APPLICATIONS

This document is a continuation-in-part of U.S. application Ser. No. 13/436,302 entitled "A Method and System for Modeling a Network Using Historical Weather Information and Operation with Adaptive Coding and Modulation (ACM)" to Wallace Davis et al., which was filed on Mar. 30, 2012 and claims the benefit of the filing date of U.S. Provisional Patent Application No. 61/596,124, entitled "A Method and System for Modeling a Network Using Historical Weather Information and Operation with Adaptive Coding and Modulation (ACM)" to Wallace Davis et al., which was filed on Feb. 7, 2012. This document also claims the benefit of U.S. Provisional Patent Application No. 61/592,948, entitled "A Method and System for Performing Multi-Layer, Multi-Dimensional Link Budget Analysis (LBA) Using Real-Time Network, Weather, Satellite Ephemeras and Ionospheric Information" to Michael Beeler et al., which was filed on Jan. 31, 2012, the disclosures of which are hereby incorporated entirely by reference herein.

BACKGROUND

1. Technical Field

Aspects of this document relate generally to telecommunication systems and techniques for transmitting data across a telecommunication channel.

2. Background Art

The ability to perform a Link Budget Analysis (LBA) for a given transmission link is known in the prior art. LBAs are performed on links ranging from deep space, satellite transmission links, airborne, terrestrial links and underwater to ascertain the characteristics of the link as well as determine the required antenna size (gain) and power (size of the amplifiers) to establish end-to-end communications. In the art, establishing end-to-end communications and overcoming the losses associated with the link is known as "closing the link."

Prior art LBAs take into consideration the Free-Space Path Loss (FSPL) whether it is atmosphere or underwater, wetting, water vapor, scintillation, rain density, etc. and are typically performed one time prior to the end-to-end terminals being placed into service. The results of the one-time LBA determine the size and capabilities of the equipment installed at the transmission site.

As background, conventional LBAs do not use real-time information, but use historical precipitation data from lookup tables, measured in mm/hr (millimeters per hour) and categorized into rain regions throughout the world. Additionally, LBAs are run in a point-to-point fashion and make no provisions for other sites or links during operation.

SUMMARY

Implementations of a method of dynamically modeling performance of a communications network may comprise modeling a communications network using a processor by performing a link budget analysis (LBA) for a configuration of the communications network, receiving, by the processor, a plurality of layers of real-time information about the communications network, iteratively performing additional LBAs by the processor using one or more of the layers of real-time information from among the plurality of layers of real-time information, multi-dimensionally co-modeling, by the processor, a matrix comprising results of the iteratively performed additional LBAs, and determining, by the processor, one or more final communications network configuration parameters based on the multi-dimensionally co-modeled matrix.

Particular implementations may comprise one or more of the following features. The real-time information may comprise user traffic information. The real-time information may comprise reported performance of signal quality and is reported as symbol energy over noise density (Es/No) or bit energy over noise density (Eb/No). The real-time information may comprise weather information. The real-time information may comprise satellite ephemeris information. The real-time information may comprise ionospheric condition information. The real-time information may comprise information relating to a location, velocity, or condition of a stationary or mobile terminal within the communications network. The method may further comprise transmitting an output of the processor to a regenerative repeating device. The method may further comprise transmitting an output of the processor to a hub, one or more remote devices, or one or more repeating relays. The processor may comprise a single processor configured to process one or more layers of real-time information. The processor may comprise a plurality of processors configured to process one or more layers of real-time information. The one or more final network configuration parameters may comply with one or more regulatory mandates. The method may further comprise monitoring a power spectral density (PSD) within the communications network and adjusting one or more network configuration parameters such that off-axis signal emissions remain below a maximum level as specified by the one or more regulatory mandates. The method may further comprise monitoring a transmit power of a transmitter within the communications network and adjusting one or more network configuration parameters such that the transmit power remains below a maximum level as specified by the one or more regulatory standards. The method may further comprise adjusting one or more network configuration parameters such that the communications network complies with static ground, earth surface vehicle, vehicle-mounted earth station, and aircraft earth station International Telecommunication Union (ITU) or Federal Communications Commission (FCC) Aeronautical Mobile Satellite Service (AMSS) regulatory limits. The method may further comprise disabling transmission by a transmitter within the communications network when there is no combination of network configuration parameters that results in the communications network remaining in compliance with the one or more regulatory mandates. The method may further comprise outputting an error message when the communications network is noncompliant with the one or more regulatory mandates. The error message may comprises a textual message, a binary signal, or an error condition.

Implementations of a system for dynamically modeling performance of a communications network may comprise a communications network comprising at least one transmitter, at least one satellite repeating relay, and at least one remote receiver and a processor configured to model the communications network by performing a link budget analysis (LBA) for a configuration of the communications network, receive a plurality of layers of real-time information about the communications network, iteratively perform additional LBAs using one or more of the layers of real-time information from among the plurality of layers of real-time information, multi-dimensionally co-modeling, by the processor, a matrix comprising results of the iteratively performed additional LBAs, and determine one or more final communications network configuration parameters based on the multi-dimensionally co-modeled matrix.

Particular implementations may comprise one or more of the following features. The real-time information may comprise user traffic information. The real-time information may comprise reported performance of signal quality and is reported as symbol energy over noise density (Es/No) or bit energy over noise density (Eb/No). The real-time information may comprise weather information. The real-time information may comprise satellite ephemeris information. The real-time information may comprise ionospheric condition information. The real-time information may comprise information relating to a location, velocity, or condition of a stationary or mobile terminal within the communications network. The processor may be further configured to transmit an output to a regenerative repeating device. The processor may be further configured to transmit an output to a hub, one or more remote devices, or one or more repeating relays. The processor may comprise a single processor configured to process one or more layers of real-time information. The processor may comprise a plurality of processors configured to process one or more layers of real-time information. The one or more final network configuration parameters may comply with one or more regulatory mandates. The processor may be further configured to monitor a power spectral density (PSD) within the communications network and adjust one or more network configuration parameters such that off-axis signal emissions remain below a maximum level as specified by the one or more regulatory mandates. The processor may be further configured to monitor a transmit power of a transmitter within the communications network and adjust one or more network configuration parameters such that the transmit power remains below a maximum level as specified by the one or more regulatory standards. The processor may be further configured to adjust one or more network configuration parameters such that the communications network complies with static ground, earth surface vehicle, vehicle-mounted earth station, and aircraft earth station International Telecommunication Union (ITU) or Federal Communications Commission (FCC) Aeronautical Mobile Satellite Service (AMSS) regulatory limits. The processor may be further configured to disable transmission by a transmitter within the communications network when there is no combination of network configuration parameters that results in the communications network remaining in compliance with the one or more regulatory mandates. The processor may be further configured to output an error message when the communications network is noncompliant with the one or more regulatory mandates. The error message may comprise a textual message, a binary signal, or an error condition.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

FIGS. 6A-H provide an example of a Link Budget Analysis for a transmission link using a commercial satellite repeating relay.

FIG. 7 provides an example of various modulation and FEC coding combinations of an exemplary MODCOD configuration and the associated Eb/No and Es/No required to close the link.

FIG. 8 provides an example of various modulation and FEC coding combinations of a DVB-S2 MODCOD configuration and the associated Es/No required to close the link.

FIG. 9 is a block diagram showing examples of possible inputs into an implementation of the processing model along with possible outputs.

FIG. 10 is a block diagram showing examples of possible inputs for an implementation of a multi-layered, multi-dimensional distributed processing engine along with possible outputs.

DESCRIPTION

Figure 1:
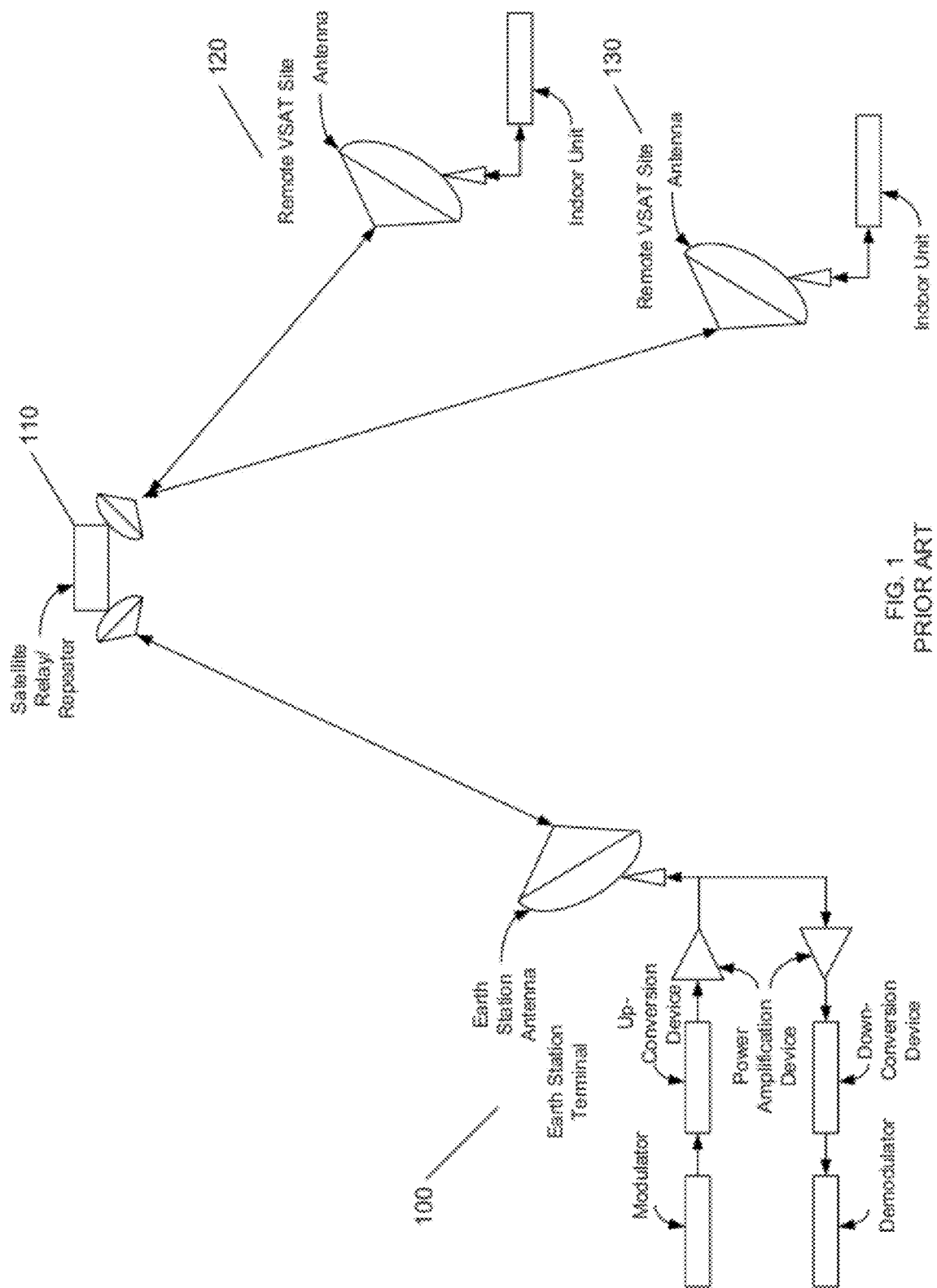
FIG. 1 is a representation of an implementation of a geographically diverse satellite network with a hub earth station terminal communicating with multiple remote sites.

This disclosure, its aspects and implementations, are not limited to the specific components, frequency examples, or methods disclosed herein. Many additional components and assembly procedures known in the art consistent with a method and system for performing multi-layer, multi-dimensional link budget analysis (LBA) using real-time network, weather, satellite ephemeras and ionosheric information are in use with particular implementations from this disclosure. Accordingly, for example, although particular implementations are disclosed, such implementations and implementing components may comprise any components, models, versions, quantities, and/or the like are known in the art for such systems and implementing components, consistent with the intended operation.

This disclosure relates to, but is not limited to, a method and system for performing multi-layered, multi-dimensional link budget analysis (LBA) using real-time network, weather, satellite ephemeras and ionosheric information. Implementations of the described method and system may support point-to-point, point-to-multipoint and multipoint-to-multipoint networks that provide transmission from a source to a destination and may utilize a repeating relay such as a space-based satellite repeating relay or an airborne repeating relay.

LBAs performed in the prior art utilize known values as demonstrated in FIG. 6, and are used to determine the losses associated with the link (for example, path loss, environmental loss, etc.), and required antenna sizes and amplifier sizes required to overcome link losses to close the link to arrive at an estimated link availability. Ultimately, link availability is the driving factor that any transmission link strives to improve or optimize.

An aspect of novelty of the disclosure is that LBAs are no longer performed one time, on a single transmission link and the site placed into service. Instead, the LBAs are performed in real-time while factoring in the location of all terminals (fixed and mobile), network traffic configurations (dynamic user data), real-time weather, satellite ephemeras and ionosheric scintillation, time delay due to the Doppler shift in an in-motion object application, and any other factors that may impact the demodulator buffering. All of these parameters are fed into the model, and LBAs are performed firstly in a multi-layered format, and then a multi-dimensionally co-modeled group of LBAs is produced. LBAs traditionally assume worst-case conditions and the links are engineered to those worst case conditions at which the network will continue to operate as long as the link conditions remain at the engineered availability. When engineering a link to operate at a given availability, there are consequential inefficiencies that occur due to the necessity to design a link for worst-case conditions. A result of this practice is that amplifiers and antennas are not fully utilized to maximize efficiency.

Once a baseline LBA is performed to determine the hardware components of the network (such as, for example, required antenna gain/size and power amplifier size), this information is then entered as fixed values into the baseline LBA. The variables that are then fed into the system are real-time weather data that is a function of location of all terminals (fixed or mobile), precipitation estimates with temperature, density and the trajectory (direction) of the precipitation that may be extrapolated, location of the repeating relay (satellite or airborne relay), ionic scintillation, solar interaction due to sun spot, solar flares, or Coronal Mass Ejections (CME). Other parameters such as network conditions, time synchronization due to object motion and the Doppler effect, density of traffic and any a priori requirements for user data or real-time information being fed from the terminals in the form of current signal energy over noise density (Es/No) or bit energy over noise density (Eb/No), current transponder load in the form of utilized bandwidth and power and possibly in the form of Adaptive Coding and Modulation (ACM) link status messages, are also input into implementations of the system.

Combining the available information, a co-modeled series of LBAs are performed by a processing device, such as, but not limited to, a Digital Signal Processor (DSP), Field Programmable Gate Array (FPGA), General Purpose Processor (GPP), or Graphic Processing Unit (GPU). The mathematical algorithms may be processed as co-modeled M×N (M by N) matrix operations using, but not limited to, the Bellman equation. As background, the Bellman equation, also known as a dynamic programming equation, may be brought to bear as a tool for determining optimality of a complex system by breaking down the optimization problem into simpler sub-problems. Some embodiments of the present description fall into a category of extremely complex and process intensive equations that may be broken into sub-problems and then solved as a sub-process. The precise manner that solves the equations is not limited to this one technique but may be expanded to use any technique that optimizes the LBAs individually and then as a co-modeled series of operation.

A method and system for performing multi-layer, multi-dimensional link budget analysis (LBA) using real-time network, weather, satellite ephemeras, time synchronization and ionospheric information techniques disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial broadcast network without undue experimentation.

While implementations of the described methods may pertain to satellite technology, implementations described are not limited to satellite technology, and may be applied to ground, airborne and space-based networks and systems. The need for more bandwidth continues to challenge the industry. The options that are available to network operators are to add more bandwidth, but for radio transmission networks, the spectrum is finite, and it is not always possible to simply add spectrum. Implementations of the methods and systems described in this disclosure allow one to further optimize the available spectrum by taking every metric that may be available for optimizing the link.

In the prior art, a Link Budget Analysis (LBA) was performed one time taking the required availability of the link, based on the operating frequency, path loss, available antenna gain, amplifier gain, etc., and using this information as a worst case condition of operation to meet the required availability. With the introduction of Adaptive Coding and Modulation (ACM) as described in European Telecommunications Standards Institute (ETSI) engineering requirements (EN 302-307) the contents of which is herein incorporated by reference in its entirety, an ACM approach for addressing dynamic link conditions is described. ACM allows one to know the link is changing, a posteriori, but this causes the system to be reactive instead of proactive.

In the prior art, all LBA information and operation is completely based on historical and more importantly, static information. An aspect of novelty of implementations of the described method and system is that link conditions may be pre-determined based on input metrics to determine the optimal link operating parameters for a particular site or a group of sites based on network conditions. To optimize the operation of an entire network, a multitude of factors must be known. In the prior art, estimates were made based on historical data as to the level of degradation of the link (based on for example, rain zone data, historical ionospheric data, satellite ephemeris date, etc.) to come up with a worst-case operational design that the link was engineered to meet. With the ability to import weather data, ionosphere data, satellite ephemeris data, real-time network feedback, antenna type (phased array), skew angle to the spacecraft and motion of objects, etc. coupled with the ability process the extremely large volume of information, it is now possible to determine in real-time the optimal link conditions based on nearly all metrics of a network to achieve near 100% utilization of the available network resources.

FIG. 1 illustrates a typical satellite configuration with three sites. A hub earth station terminal 100 is communicating over a satellite repeating relay 110 to two geographically diverse remote sites 120, 130. As shown in FIG. 1, an antenna and power amplification devices are present at the hub earth station terminal 100, satellite repeating relay 110 and the remote VSAT site 120, 130. Each device (earth stations 100, 120, 130 and satellite repeating relay 110) all have antennas and amplifications devices with gain, but the path between the earth stations 100, 120, 130 and the satellite 110 have losses. As an example, a Ku-Band signal operating with an uplink center frequency of 14 GHz would have a Free-Space Path Loss (FSPL) from the earth station 100 to the satellite 110 of approximately 207.0 Decibels (dB) with no impairments (rain, clouds, etc.). The path from the satellite 110 to an earth station 120, 130 with a downlink center frequency of 12 GHz would have a path loss of approximately 205.5 dB with no impairments (rain, clouds, etc.).

Figure 2:
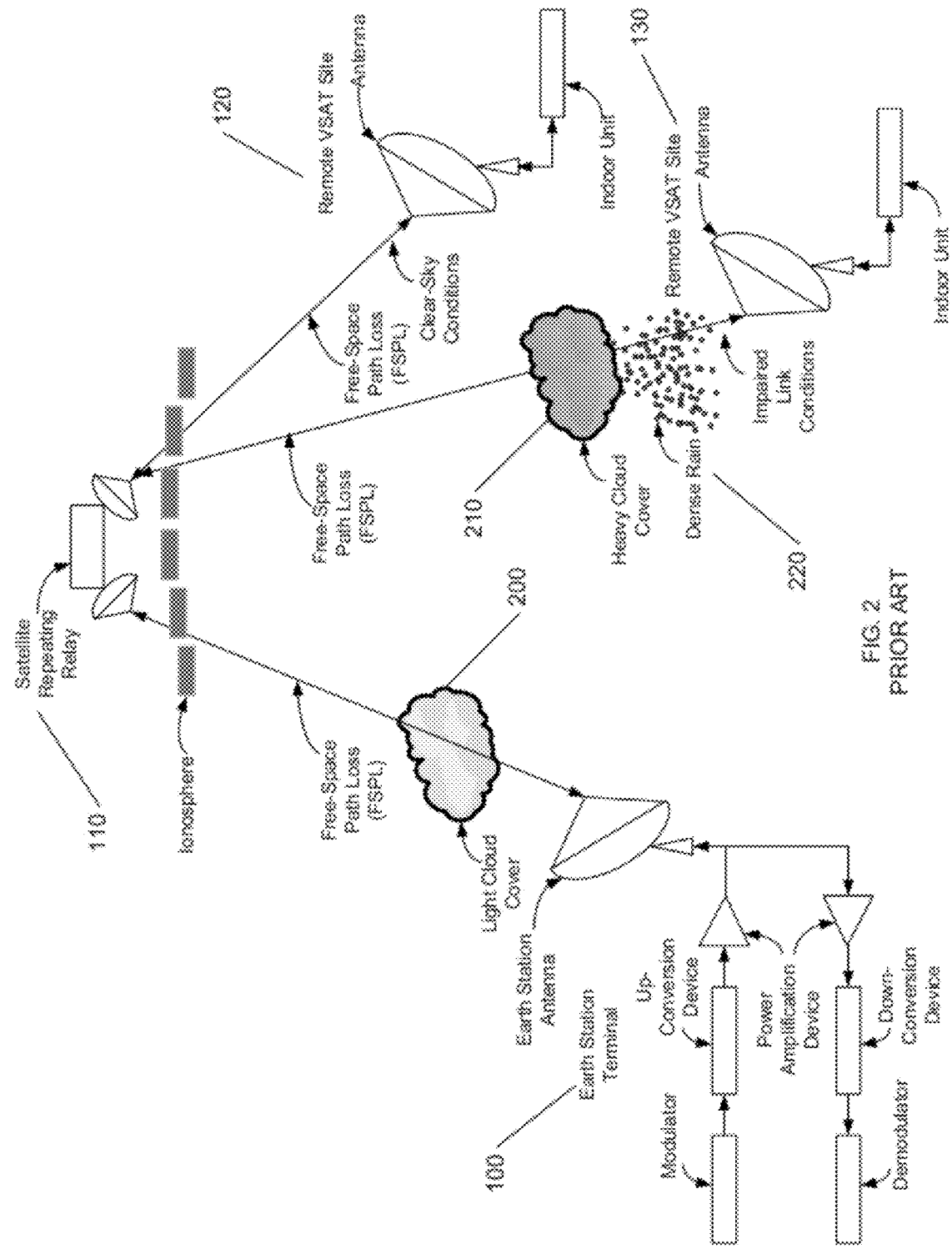
FIG. 2 is a representation of an implementation of a geographically diverse satellite network with a hub earth station terminal communicating with multiple remote sites experiencing precipitation resulting in dynamic path losses.

FIG. 2 illustrates a typical satellite configuration with three sites and the associated areas where transmission loss may be introduced. A hub earth station terminal 100 is 100 communicating over a satellite repeating relay 110 to two geographically diverse remote sites 120, 130. In the illustration, the FSPL remains relatively constant for stationary terminals, but changes slightly for mobile terminals and ephemeris affects due to satellite movement. However, below an altitude of 20 Km (65,000 feet), weather conditions may have a drastic affect on the transmission path. Clouds 200, 210 or water vapor have a slight effect (depending on the transmission frequency), but the most pronounced attenuation as a result of weather is due to precipitation 220. Condensation may form on a radome or antenna reflector and which creates wetting losses. Another major contributor to attenuation is due to ionospheric scintillation. Ionospheric scintillation is the result of rapid, random, turbulent motions of the ionosphere at an altitude of approximately 300 Km (984,251 feet) depending on the layer (D, E, F, F1 or F2) and the time of day or night, and causes scintillation of the signal as it passes through the atmosphere.

Figure 3:
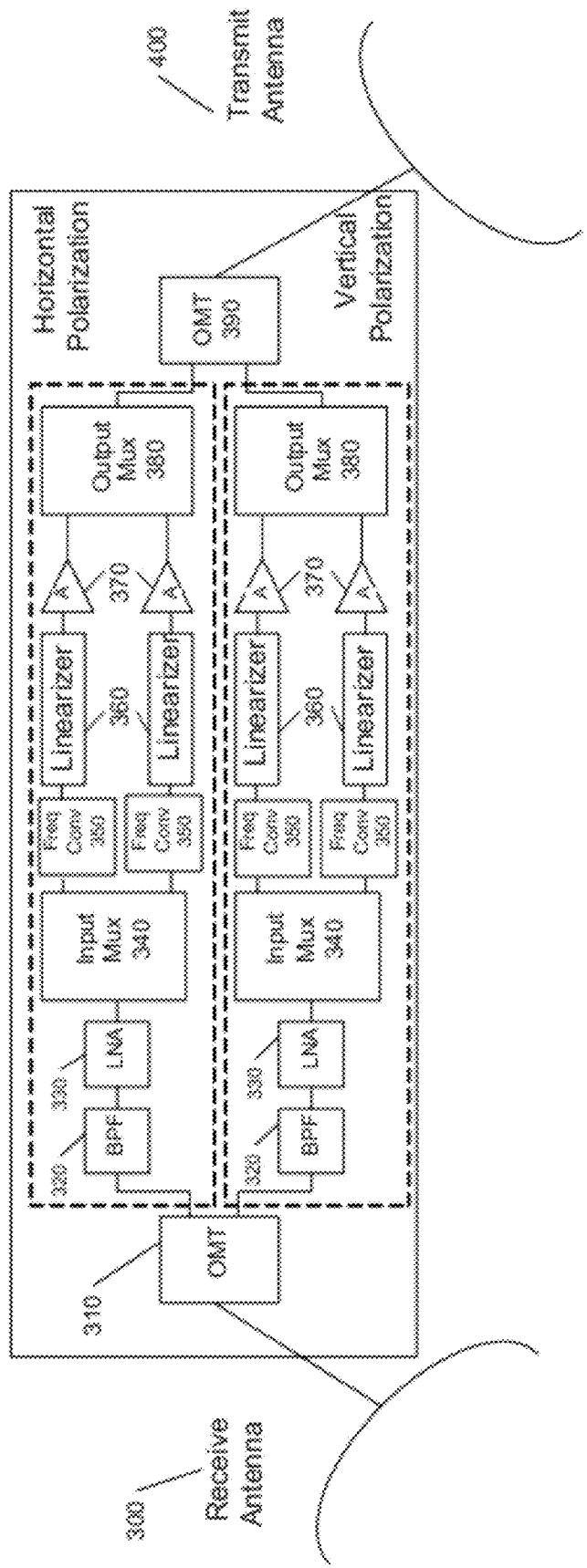
FIG. 3 is a representation of an implementation of a satellite repeating relay.
Figure 4:
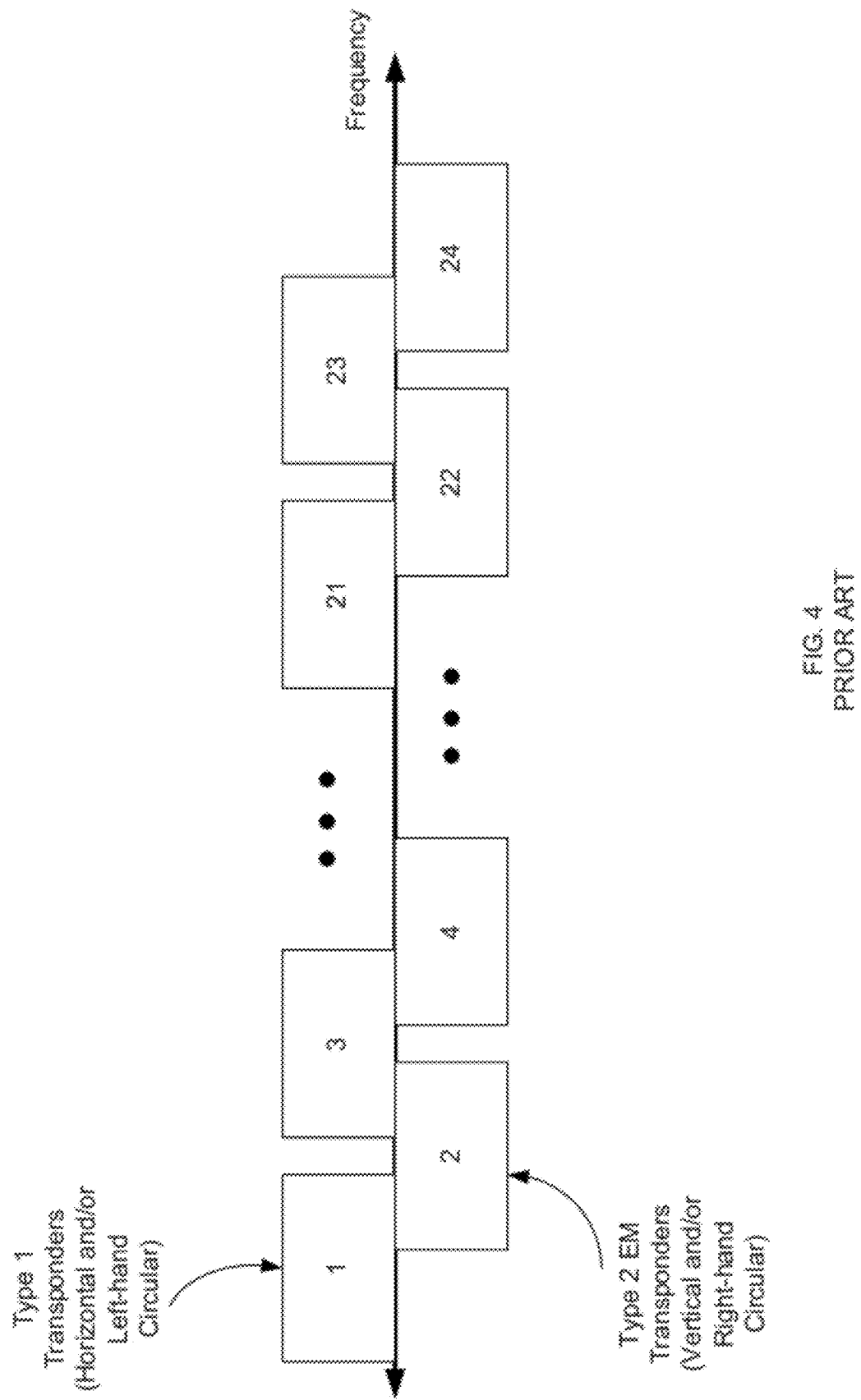
FIG. 4 is a representation of an implementation of transponders on a satellite repeating relay based on an electromagnetic (EM) polarization configuration.

FIG. 3 illustrates a typical satellite based repeating relay used in the art with no onboard processing. The repeating relay comprises an input (receive antenna) 300 which receives the incoming carrier signals, Orthogonal Mode Transducer (OMT) 310 that separates the various electromagnetic (EM) polarizations, Bandpass Filters (BPF) 320 that filter the frequency spectrum, a Low-Noise Amplifier (LNA) 330 that allows the received carrier signals to be power amplified, a multiplexer 340 which separates the various frequency spectra to the appropriate transponder and a frequency converter 350 to convert to the downlink frequency. The repeating relay further linearizes 360 any non-linearity due to the amplifiers, amplifies 370 before transmitting back to the destination, multiplexes 380 to the proper EM polarization configuration and feeds to the OMT 390 to the transmit antenna 400 feed for relay. The configuration of the transponders of the repeating relay may be comprised of a single transponder or a plurality of EM transponders with or without overlapping frequencies as shown in FIG. 4.

FIGS. 6A-H illustrate examples of inputs of a Link Budget Analysis (LBA). Implementations of the described methods continue to take advantage of the LBA which appears as a large equation with dependencies on factors such as by non-limiting example, uplink and downlink frequencies, antenna gain, amplifier gain, path loss, location, satellite figure of merit (G/T), and equivalent isotropically radiated power (EIRP).

Applying a multi-layered approach to the LBA allows one to apply many parameters to an LBA in an iterative fashion resulting in optimization of a single link from one station to another station. By iteratively processing and reprocessing the LBA, a single link may be optimized. Once a single link is optimized, the process is repeated for a plurality or every link in a network.

Figure 5:
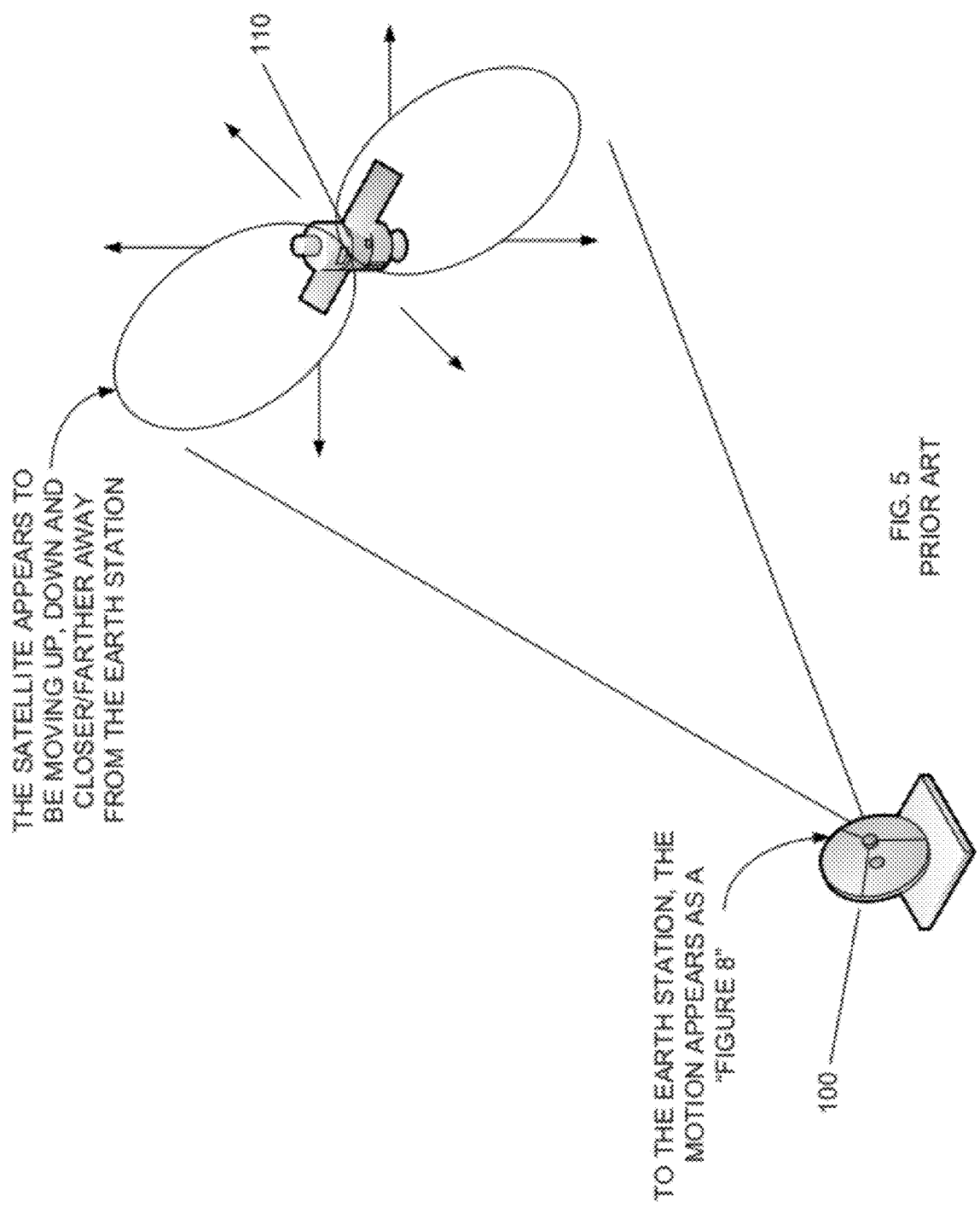
FIG. 5 is a representation of a path of movement of a spacecraft relative to an earth station.

Another aspect of novelty of the present disclosure is that real-time information may be inserted into the model at this stage of the processing. Weather data comprising the cloud type, height, density of precipitation and trajectory, etc. may be obtained, formatted and input into the model. Ionospheric monitoring stations are collected and distributed throughout the world and so an estimate of the effects of the ionospheric layers may be obtained, formatted and input into the model. The movement of a satellite and Kepler's Laws of motion (Keplerian movement) is applied and allows one to predict the precise location of a repeating relay. The data in the satellite industry is known as "ephemeris data" and may be calculated as much as 30 days in advance. Ephemeris data containing the location of the satellite repeating relay may be obtained, formatted and input into the model. As shown in FIG. 5 and as is known in the prior art, the path of a space-based satellite repeating relay 110 appears to be a "Figure Eight" pattern to a hub earth station 100.

Many networks have the ability to provide status of the link in the form of a received Es/No or Eb/No of the signal that is received by the terminal. The networks may provide current bandwidth requirements based on the current traffic flow thought the network and provided as input into the model. Additionally, the location of the terminal may be reported in the form of latitude, longitude, altitude, velocity, temperature, etc. and reported to the location where the information is being collected and input into the model.

From the real-time information and network information, the LBAs may be updated and re-run with the following dependencies on factors such as, for example, rain attenuation, cloud attenuation, ionospheric attenuation, terminal movement, network data, etc.

The resulting LBAs may then be co-modeled as an N×M matrix using dynamic programming due to the large number of inputs into the model. This may allow one to ascertain the total loading of all the components in the model and to make adjustments to further optimize resources such as, for example, distribution of available amplifier power at the earth stations and satellite, assignment of Modulation Factor and FEC Coding Rate, distribution of available bandwidth, assignment of transmission frequency and time slots, and a retransmission interval.

FIGS. 7 and 8 are tables showing a representation of available modulation and FEC coding rates, spectral efficiencies and required Es/No or Eb/No rates to provide a given performance at a known Bit Error Rate (BER) or Packet Error Rate (PER). The link performance is known along with the available power, the allocation of spectrum, etc. are distributed and the appropriate MODCOD may be applied to the link to meet the requisite service level or as known in the art Service Level Agreement (SLA) which may be based on providing a guaranteed amount of bandwidth known as a Committed Information Rate (CIR).

FIG. 9 illustrates an implementation of a processing module 950 in which the input may be a plurality of information such as, for example parameters of network configuration 900, network traffic 910, network Es/No or Eb/No 920, terminal location (static or dynamic) 930, weather information 940, ionospheric information 970, satellite ephemeris information 980, time delay due to the Doppler effect 990, etc. where it may be processed in both a multilayered manner and then combined and processed in a multi-dimensional manner resulting in optimized assignments of time, frequency, bandwidth, modulation, FEC coding, etc. for the network. The resulting processing to support implementations of the method and system may be considered a sub-system to the communications network. As prior art, existing networks operate without implementations of the described method and system, though at a lower level of efficiency or availability. When employing implementations of the described method and system one realizes higher levels of efficiency and higher availability of a link and the entire system as a whole.

A resulting side effect of the optimization results in changes to the power and waveform as a result of the use of implementations of the method and system. A provision may be made to monitor that all regulatory issues are being complied with. As power and the waveform are adjusted, the result may be increased Power Spectral Density (PSD), Adjacent Satellite Interference (ASI), etc. The PSD and ASI could be increased to a level that is above and beyond a regulatory limit. Implementations of the described invention may provide checks and balances within the processing of the available information to ensure that PSD, ASI and other regulatory limits are maintained and action taken to correct any violation of the regulations. The corrections may be iteratively fed back into the processing to further optimize the link.

FIG. 10 illustrates an implementation of a processing module in which the input may be a plurality of information such as, for example parameters of network configuration, network traffic, network Es/No or Eb/No, terminal location (static or dynamic), weather information, ionospheric information, satellite ephemeris information, time delay due to the Doppler effect, etc. where it may be processed by a plurality of processors 1000, 1010 as layers and then processed as dimensions 1020 (all layers are then co-modeled) and the output may be output or fed back into the layer processing 1000, 1010 for further optimization. The resulting output may be optimized assignments of time, frequency, bandwidth, modulation, FEC coding, etc. assignments for the network.

In the prior art, processing the tremendous amount of information would be a daunting task. However, implementations of the described method may be implemented using, but not limited to, a video coprocessor that is natively designed to perform limited types of mathematical operations, but complex numerical processing.

Implementations of the described method and system may perform the processing at the network level (comprised of a hub and remotes) or "on-board" a space-based system. When performed at the network level, the processing may be assumed to be earthbound (or not in space). However, for space-based (or on the repeating relay), a portion of the processing may be done on the ground and then transmitted to the on-board processor on the space-based relay for operation.

Particular implementations of the described methods and systems may be applied to any frequencies but would be most beneficial to Very High Frequency (VHF) up to, but not limited to, V-Band. When operating at frequencies above Ku-Band, e.g. Ka and V-Band, the concept of sub-beams become another variable in the processing. Within a satellite's beam, the sub-beams may be a variable that may be applied to the processing to allow further optimization for determining the best use of the available spectrum. The sub-beams may be decisions that are made in the model to use a sub-beam or move to a new sub-beam based available spectrum and power.

As yet another variable to the model that may be applied as an input is the skew angle. The skew angle is the result of the polarization angle and is dependent on the placement of the terminal's location relative to the satellite repeating relay. For mobile terminals, the skew must constantly change as a result of the terminals location. The model may provide optimization of the skew angle as part of the processing for the method and system.

The following are particular implementations of methods and systems for performing multi-layered, multi-dimensional link budget analysis (LBA) using real-time network, weather, satellite ephemeras and ionospheric scintillation information techniques and are provided as non-limiting examples:

EXAMPLE 1

A satellite network is configured to operate a hub-spoke Very Small Aperture Terminal (VSAT) with a single fixed hub earth station and a plurality fixed remote sites over a Ku-Band geostationary satellite repeating relay. The network is configured to accept network data, feedback of the Es/No, and weather information. Using an implementation of the described method, LBAs are iteratively processed in a manner that results in the assignment of the modulation index and FEC rate (MODCOD assignments) and frequency and bandwidth assignments being a priori. In areas where the sky is clear, the MODCODs are set to operate at the highest possible value, but in areas where weather is occurring, the MODCODs, frequency and bandwidth parameter assignments are adjusted to ensure optimal operation of the network. In particular implementations of the system described in this Example, the satellite uses Ka-Band or V-Band, resulting in the same operation.

EXAMPLE 2

A satellite network is configured to operate a hub-spoke Very Small Aperture Terminal (VSAT) with a single fixed hub earth station and a plurality of airborne remote sites over Ka-Band geostationary satellite repeating relay. The network is configured to accept network data, satellite ephemeris, feedback of the Es/No, latitude, longitude, altitude velocity, and weather information. Using an implementation of the described method, the LBAs are iteratively processed in a manner that results in the assignment of the modulation index and FEC rate (MODCOD assignments), time slot, frequency slot, and bandwidth assignments being a priori. In areas where the sky is clear, the MODCODs are set to operate at the highest possible value, but in areas where weather is occurring, the MODCODs, frequency and bandwidth parameter assignments are adjusted to ensure optimal operation of the network. In particular implementations of the system described in this Example, the satellite uses X-Band, KU-Band or V-Band, resulting in the same operation.

EXAMPLE 3

A satellite network is configured to operate a hub-spoke Very Small Aperture Terminal (VSAT) with a single fixed hub earth station and a plurality of maritime remote sites over C-Band geostationary satellite repeating relay. The network is configured to accept network data, satellite ephemeris, feedback of the Es/No, latitude, longitude, altitude velocity, and weather information. Using an implementation of the described method, the LBAs are iteratively processed in a manner that results in the assignment of the modulation index and FEC rate (MODCOD assignments), time slot, frequency slot, and bandwidth assignments being a priori. In areas where the sky is clear, the MODCODs are set to operate at the highest possible value, but in areas where weather is occurring, the MODCODs, frequency and bandwidth parameter assignments are adjusted to ensure optimal operation of the network. In particular implementations of the system described in this Example, the satellite uses X-Band, Ku-Band, Ka-Band or V-Band, resulting in the same operation.

In places where the description above refers to particular implementations of telecommunications systems and methods, it should be readily apparent that a number of modifications may be made without departing from the spirit thereof and that these implementations may be applied to other telecommunications system and method implementations.

The invention claimed is:

1. A method of dynamically modeling performance of a communications network, the method comprising:
modeling a communications network using a processor by performing a link budget analysis (LBA) for a configuration of the communications network;
receiving, by the processor, a plurality of layers of real-time information about the communications network;
iteratively performing additional LBAs by the processor using one or more of the layers of real-time information from among the plurality of layers of real-time information;
multi-dimensionally co-modeling, by the processor, a matrix comprising results of the iteratively performed additional LBAs; and
determining, by the processor, one or more final communications network configuration parameters based on the multi-dimensionally co-modeled matrix.

2. The method of claim 1, wherein the real-time information comprises user traffic information.

3. The method of claim 1, wherein the real-time information comprises reported performance of signal quality and is reported as symbol energy over noise density (Es/No) or bit energy over noise density (Eb/No).

4. The method of claim 1, wherein the real-time information comprises weather information.

5. The method of claim 1, wherein the real-time information comprises is satellite ephemeris information.

6. The method of claim 1, wherein the real-time information comprises ionospheric condition information.

7. The method of claim 1, wherein the real-time information comprises information relating to a location, velocity, or condition of a stationary or mobile terminal within the communications network.

8. The method of claim 1, further comprising transmitting an output of the processor to a regenerative repeating device.

9. The method of claim 1, further comprising transmitting an output of the processor to a hub, one or more remote devices, or one or more repeating relays.

10. The method of claim 1, wherein the processor comprises a single processor configured to process one or more layers of real-time information.

11. The method of claim 1, wherein the processor comprises a plurality of processors configured to process one or more layers of real-time information.

12. The method of claim 1, wherein the one or more final network configuration parameters comply with one or more regulatory mandates.

13. The method of claim 12, further comprising monitoring a power spectral density (PSD) within the communications network and adjusting one or more network configuration parameters such that off-axis signal emissions remain below a maximum level as specified by the one or more regulatory mandates.

14. The method of claim 12, further comprising monitoring a transmit power of a transmitter within the communications network and adjusting one or more network configuration parameters such that the transmit power remains below a maximum level as specified by the one or more regulatory standards.

15. The method of claim 12, further comprising adjusting one or more network configuration parameters such that the communications network complies with static ground, earth surface vehicle, vehicle-mounted earth station, and aircraft earth station International Telecommunication Union (ITU) or Federal Communications Commission (FCC) Aeronautical Mobile Satellite Service (AMSS) regulatory limits.

16. The method of claim 12, further comprising disabling transmission by a transmitter within the communications network when there is no combination of network configuration parameters that results in the communications network remaining in compliance with the one or more regulatory mandates.

17. The method of claim 12, further comprising outputting an error message when the communications network is non-compliant with the one or more regulatory mandates.

18. The method of claim 17, wherein the error message comprises a textual message, a binary signal, or an error condition.

19. A system for dynamically modeling performance of a communications network, the system comprising:
a communications network comprising at least one transmitter, at least one satellite repeating relay, and at least one remote receiver; and
a processor configured to:
model the communications network by performing a link budget analysis (LBA) for a configuration of the communications network;
receive a plurality of layers of real-time information about the communications network;

iteratively perform additional LBAs using one or more of the layers of real-time information from among the plurality of layers of real-time information;

multi-dimensionally co-modeling, by the processor, a matrix comprising results of the iteratively performed additional LBAs; and determine one or more final communications network configuration parameters based on the multi-dimensionally co-modeled matrix.

20. The system of claim 19, wherein the real-time information comprises user traffic information.

21. The system of claim 19, wherein the real-time information comprises reported performance of signal quality and is reported as symbol energy over noise density (Es/No) or bit energy over noise density (Eb/No).

22. The system of claim 19, wherein the real-time information comprises weather information.

23. The system of claim 19, wherein the real-time information comprises is satellite ephemeris information.

24. The system of claim 19, wherein the real-time information comprises ionospheric condition information.

25. The system of claim 19, wherein the real-time information comprises information relating to a location, velocity, or condition of a stationary or mobile terminal within the communications network.

26. The system of claim 19, wherein the processor is further configured to transmit an output to a regenerative repeating device.

27. The system of claim 19, wherein the processor is further configured to transmit an output to a hub, one or more remote devices, or one or more repeating relays.

28. The system of claim 19, wherein the processor comprises a single processor configured to process one or more layers of real-time information.

29. The system of claim 19, wherein the processor comprises a plurality of processors configured to process one or more layers of real-time information.

30. The system of claim 19, wherein the one or more final network configuration parameters comply with one or more regulatory mandates.

31. The system of claim 30, wherein the processor is further configured to monitor a power spectral density (PSD) within the communications network and adjust one or more network configuration parameters such that off-axis signal emissions remain below a maximum level as specified by the one or more regulatory mandates.

32. The system of claim 30, wherein the processor is further configured to monitor a transmit power of a transmitter within the communications network and adjust one or more network configuration parameters such that the transmit power remains below a maximum level as specified by the one or more regulatory standards.

33. The system of claim 30, wherein the processor is further configured to adjust one or more network configuration parameters such that the communications network complies with static ground, earth surface vehicle, vehicle-mounted earth station, and aircraft earth station International Telecommunication Union (ITU) or Federal Communications Commission (FCC) Aeronautical Mobile Satellite Service (AMSS) regulatory limits.

34. The system of claim 30, wherein the processor is further configured to disable transmission by a transmitter within the communications network when there is no combination of network configuration parameters that results in the communications network remaining in compliance with the one or more regulatory mandates.

35. The system of claim 30, wherein the processor is further configured to output an error message when the communications network is noncompliant with the one or more regulatory mandates.

36. The system of claim 35, wherein the error message comprises a textual message, a binary signal, or an error condition.

* * * * *